United States Patent
Lunden

(10) Patent No.: US 6,722,844 B2
(45) Date of Patent: Apr. 20, 2004

(54) LUMBER STACKING APPARATUS WITH AUTOMATED STICKER FEEDING FEATURE FOR PLACING STICKERS BETWEEN BOARD LAYERS

(76) Inventor: Sidney L. Lunden, 2415 S. Sunnybrook La., Veradale, WA (US) 99037

(*) Notice: Subject to any disclaimer, the term of this patent is extended or adjusted under 35 U.S.C. 154(b) by 260 days.

(21) Appl. No.: 10/012,177

(22) Filed: Oct. 26, 2001

(65) Prior Publication Data

US 2003/0082043 A1 May 1, 2003

(51) Int. Cl.[7] ............................................. B65G 57/18
(52) U.S. Cl. ................................ 414/789.5; 414/794.1; 414/794.3
(58) Field of Search ..................... 414/789.5, 793.4, 414/794, 794.1, 794.3, 794.4

(56) References Cited

U.S. PATENT DOCUMENTS

| | | |
|---|---|---|
| 1,225,523 A | 5/1917 | Surles |
| 2,915,202 A | 12/1959 | Aitken |
| 3,081,888 A | 3/1963 | Lawson |
| 3,114,466 A | 12/1963 | Willis |
| 3,437,215 A | 4/1969 | Lunden |
| 3,737,052 A | 6/1973 | Lunden |
| 3,737,053 A | 6/1973 | Lunden |
| 3,743,113 A | 7/1973 | Eaton et al. |
| 3,860,128 A | 1/1975 | Lunden |
| 3,904,044 A | 9/1975 | Lunden |
| 3,904,046 A | 9/1975 | Lunden |
| 3,904,047 A | 9/1975 | Lunden |
| 3,968,886 A | 7/1976 | Leon |
| 4,057,150 A | 11/1977 | Lunden |
| 4,253,787 A | 3/1981 | Lunden et al. |
| 4,264,253 A | 4/1981 | Kennison |
| 4,324,520 A | 4/1982 | Kjellberg |
| 4,324,521 A | 4/1982 | Lunden et al. |
| 4,330,055 A | 5/1982 | Lunden |
| 4,801,233 A | 1/1989 | Ritola ..................... 414/789.5 |
| 4,878,803 A | 11/1989 | Whiddon ................. 414/789.5 |
| 5,350,272 A | 9/1994 | Bowlin .................... 414/789.5 |
| 5,580,212 A | 12/1996 | Andersson et al. ...... 414/789.5 |
| 5,720,592 A | 2/1998 | Gillingham et al. ..... 414/789.5 |
| 5,993,145 A | 11/1999 | Lunden ................... 414/789.5 |

*Primary Examiner*—Janice L. Krizek
(74) *Attorney, Agent, or Firm*—Wells St. John P.S.

(57) ABSTRACT

A lumber stacking apparatus 10 is described for forming a stack 12 of layers 14 of boards with stickers placed transversely between the layers. The apparatus 10 has a reciprocating arm structure 50 for successively picking up layers from an elevated surface and moving the layers over to a stacking station where the layers are stripped from the arm structure 50 as the arm structure 50 is retracted. The arm structure 50 has lifting arms 56 with open channels 64 formed therein to receive the stickers 16. A sticker distribution conveyor 160 extends along the rear of the apparatus to distribute stickers to spaced sticker stations 164 corresponding to the lifting arms 56. A sticker transfer conveyor 170 has a sticker removal subassembly 172 for engaging rear ends of the stickers at the sticker stations 164 and pushing the stickers lengthwise toward the open arm channels 64. The sticker transfer conveyor 170 has a sticker feeding subassembly 174 for engaging the forward end of the stickers and moving the stickers toward the channels 64 at a speed slower than the average reciprocating speed of the arm structure.

16 Claims, 13 Drawing Sheets

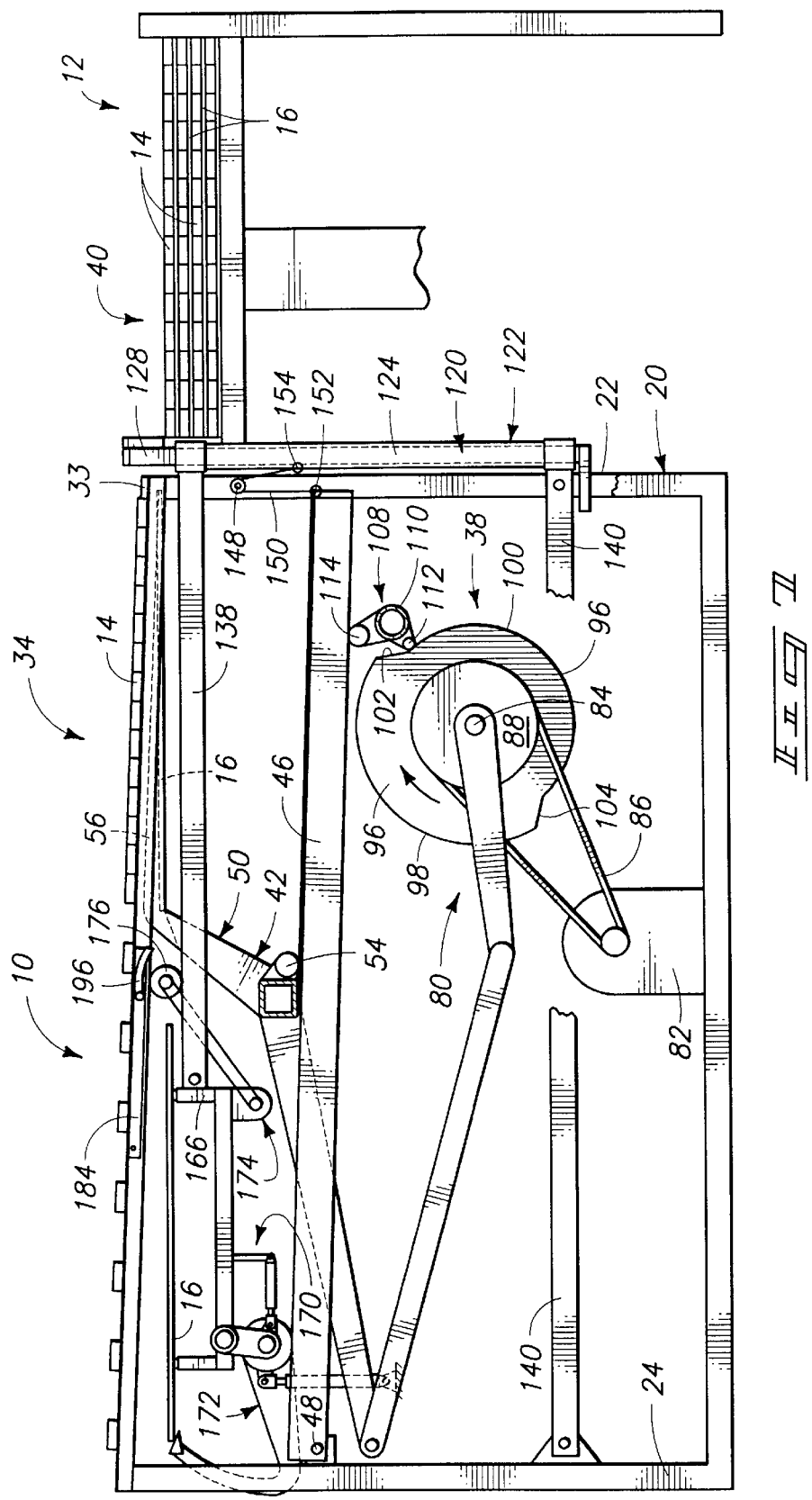

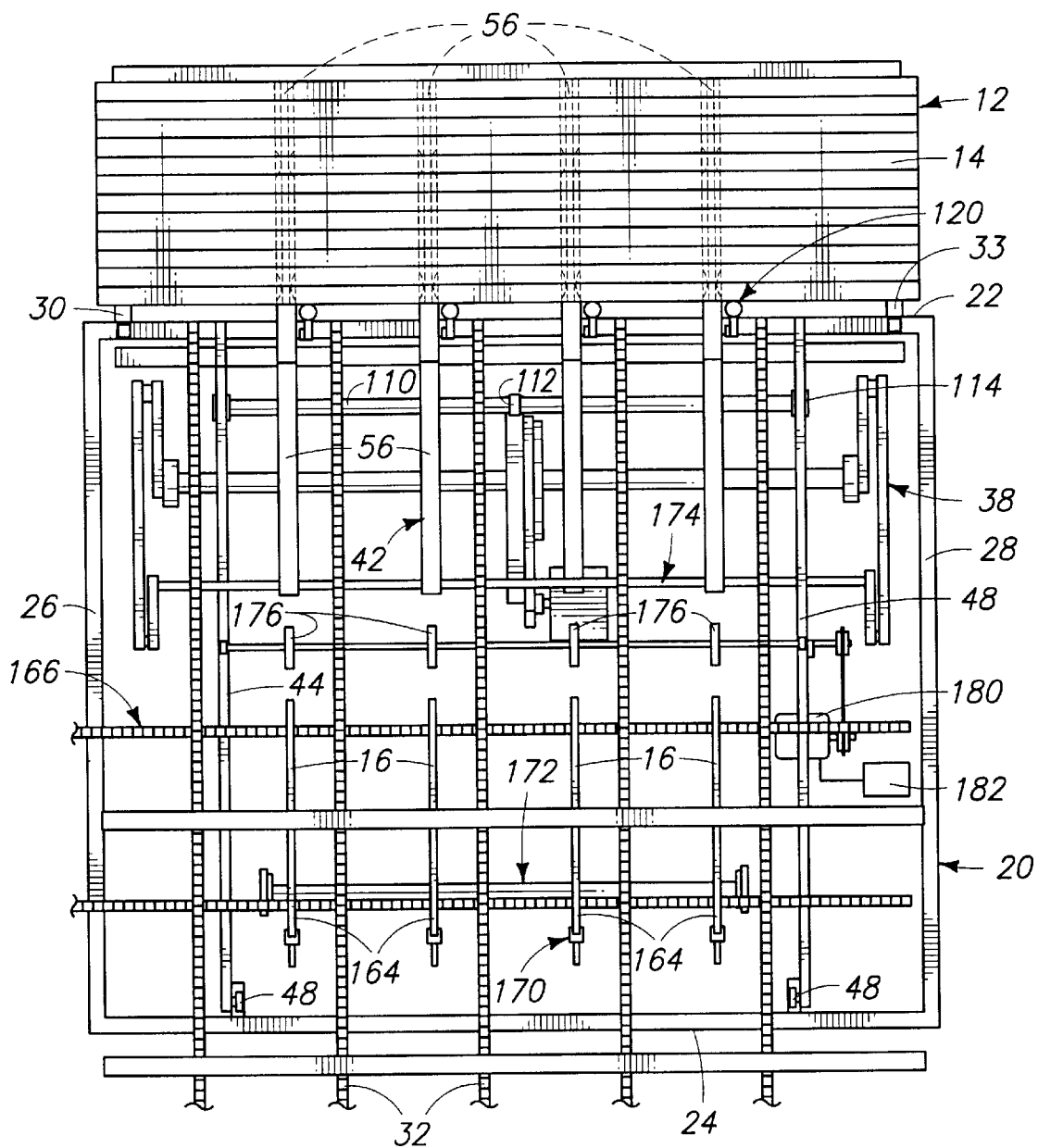

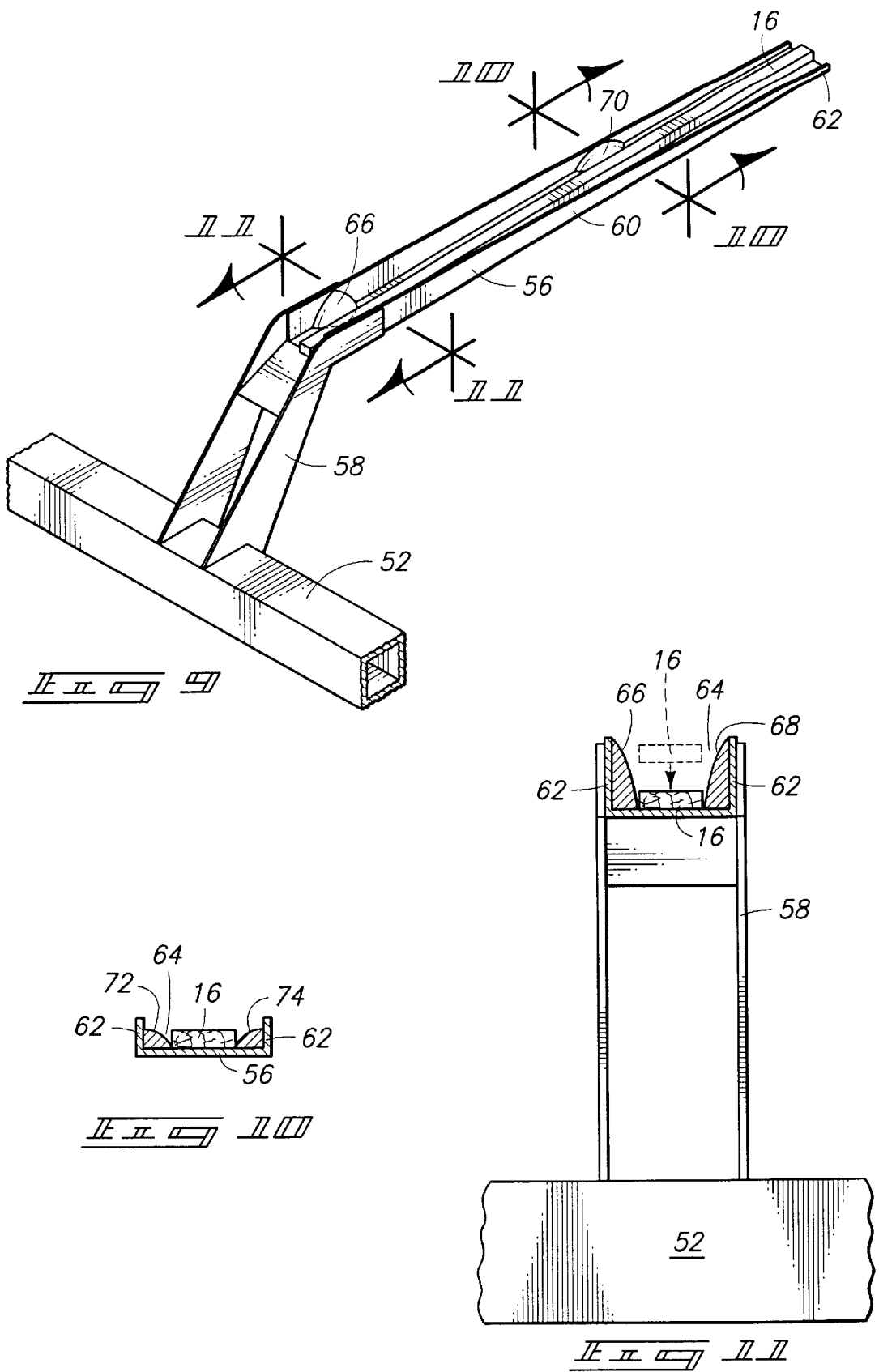

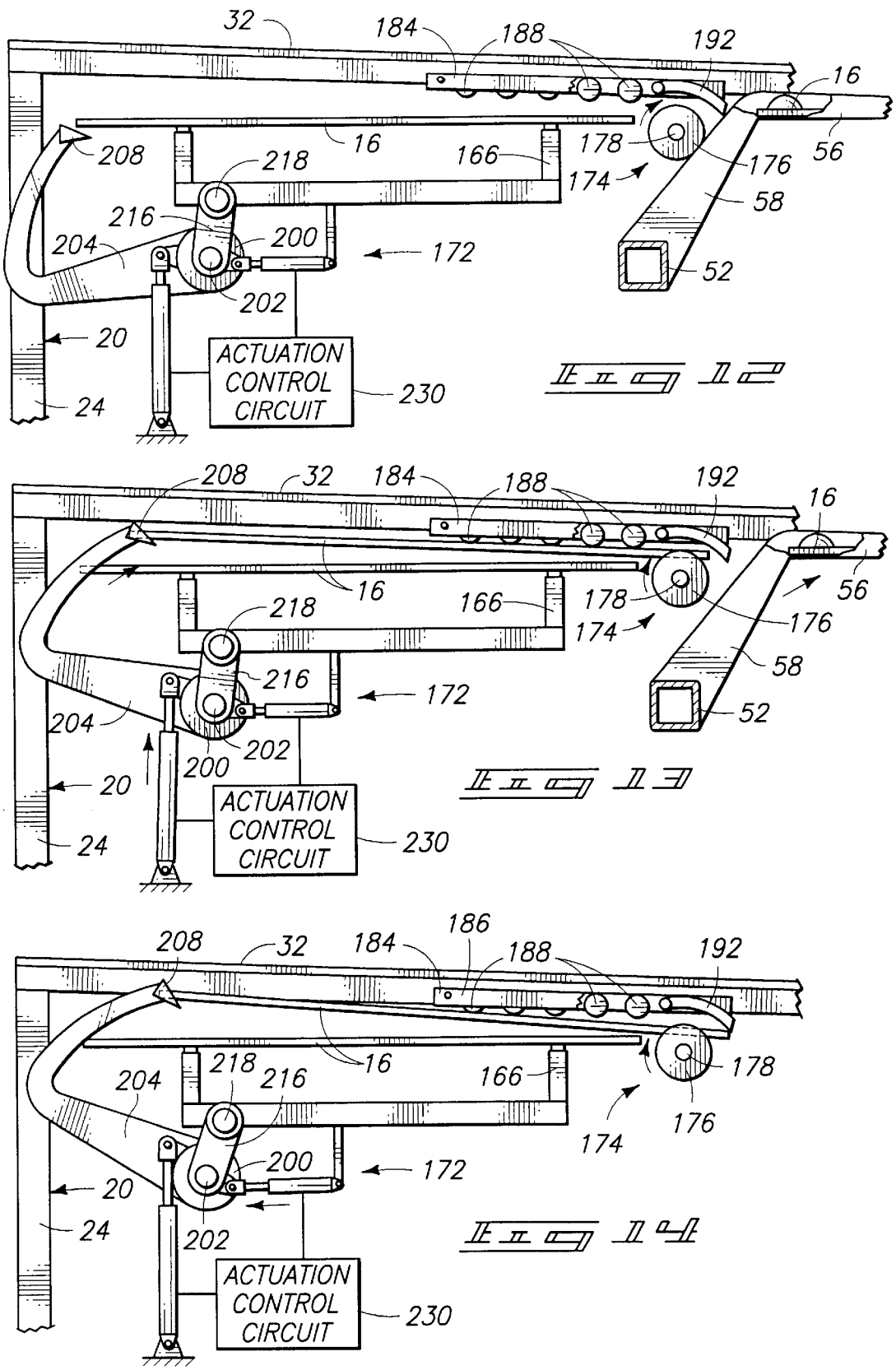

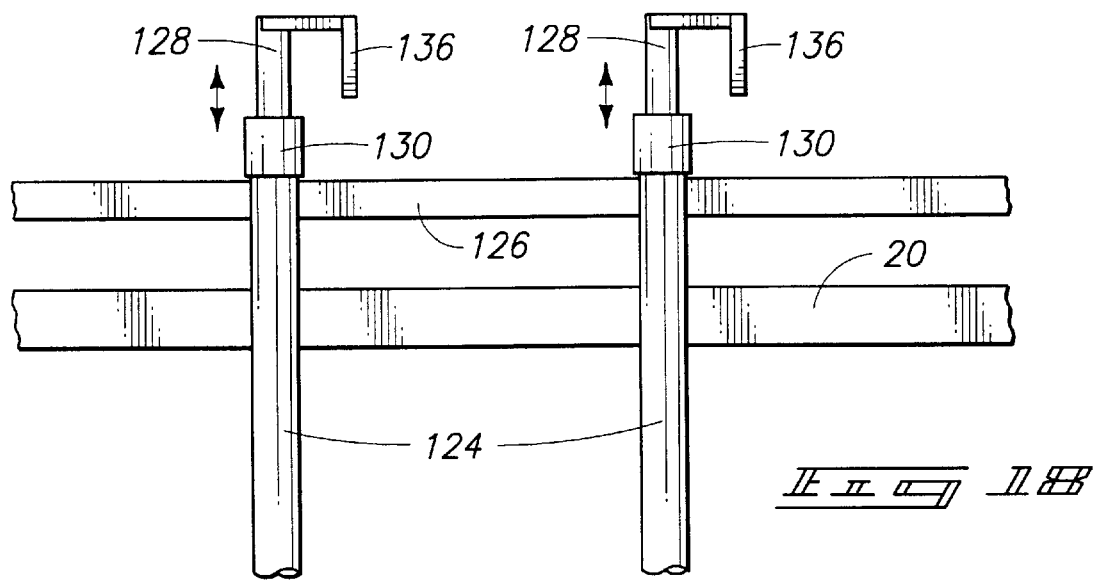
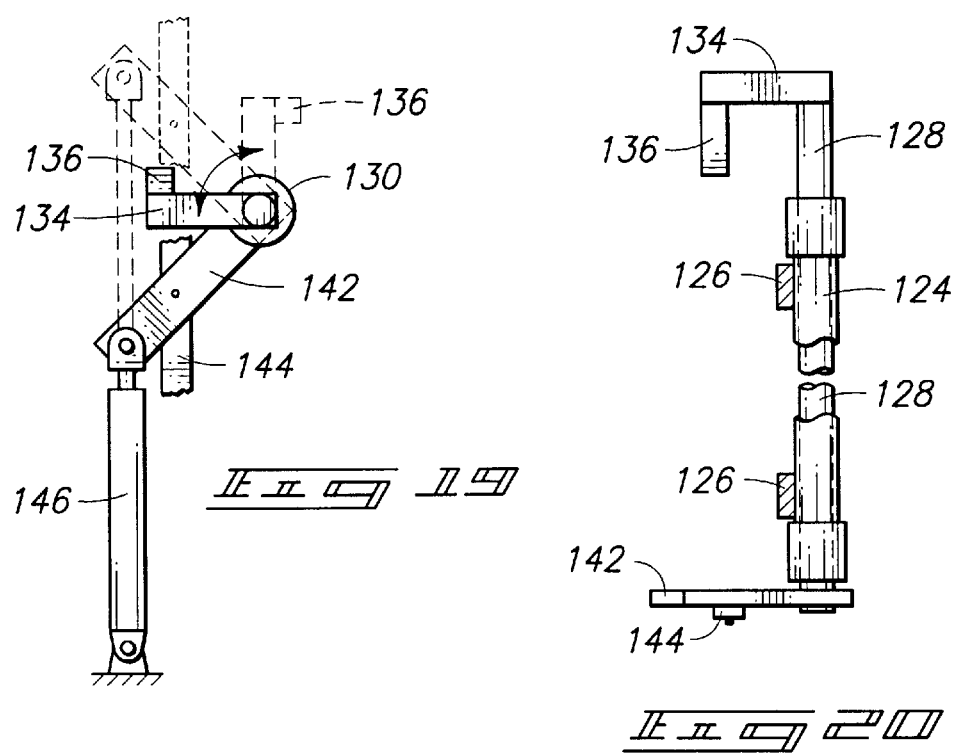

LUMBER STACKING APPARATUS WITH AUTOMATED STICKER FEEDING FEATURE FOR PLACING STICKERS BETWEEN BOARD LAYERS

CROSS REFERENCE TO RELATED APPLICATION

None.

TECHNICAL FIELD

This invention relates to lumber stacking equipment and more particular to lumber stacking equipment having mechanisms for placing stickers between board layers during the formation of a stack.

BACKGROUND OF THE INVENTION

Lumber boards are freshly cut from logs and then generally sorted by width and length. Frequently the boards are then arranged in a stack for drying in a dry atmosphere such as a dry kiln. During the stacking process, elongated wooden slats called "stickers" are placed transversely between layers or courses of boards at spaced intervals along the length of the stack to separate the layers. Usually, the stickers have lengths equal to the width of the stack and are positioned transverse to the boards in the stack. The stickers are placed at desired intervals along the length of the stack to separate the layers of boards to enable drying gases to circulate through the stack to uniformly dry the boards. Dry boards are less likely to warp or subsequently change shape thereby increasing their value.

Originally "stickering" was performed manually while the stack was being formed by placing the stickers by hand at the desired Intervals on top of each layer after the layer was placed on the stack, prior to placing the succeeding layer. Later on, the stickers were manually placed in spaced stickers magazines along side or over the stack and fed in unison and placed on the then top layer of the stack prior to a succeeding layer being placed in the stack.

Mr. Sidney L. Lunden thereafter invented a very commercially successful "Sticker Placement Device For Lumber Stacking Apparatus" in which the stickers are feed from a common source to sticker stations on the stacking machine. The stickers are then lifted up and placed underneath the succeeding layer as the succeeding layer was being removed from the stacker and placed on the stack. Such a combination stickering and stacking machine revolutionized the process, thereby dramatically increasing the efficiency of the process and reducing the number of operators required to operate the machine. The combined apparatus is the subject of U.S. Pat. No. 3,904,044 granted on Sep. 9, 1975. As a testament to its design, many of the machines incorporating the original invention are still in commercial operation.

Since the time of his original invention, Mr. Lunden has made several significant improvements which are the subject of several patents, including U.S. Pat. No. 4,253,787 granted Mar. 3, 1981; U.S. Pat. No. 4,324,521 granted Apr. 13, 1982; and U.S. Pat. No. 5,993,145 granted Nov. 30, 1999.

The present application is a further significant improvement which enables the stacking apparatus to operate at high speeds of up to stacking ten layers a minute while reducing the chances of a sticker malfunction or "sticker jam" and thereby reducing the occasions in which the apparatus must be stopped to clear a problem.

BRIEF DESCRIPTION OF THE DRAWINGS

Preferred embodiments of the invention are described below with reference to the following accompanying drawings.

FIG. 7 is a fragmentary right side elevational view similar to FIG. 6 except showing the arm structure moved to its rear position after the layer and stickers have been stripped in preparation for the next cycle;

FIG. 8 is a fragmentary plan view of the apparatus illustrating a sticker transfer assembly for transferring stickers from a sticker transfer conveyor to the layer pickup station;

FIG. 9 is an isometric fragmentary view of a portion of an arm structure showing a open sticker channel formed in an arm;

FIG. 10 is a vertical cross-sectional view taken along line 10—10 in FIG. 9 illustrating a forward cross-section of the arm with a sticker therein;

FIG. 11 is a vertical cross-sectional view taken along line 11—11 in FIG. 9 illustrating a rearward cross-section of the arm with a sticker therein;

FIGS. 12–16 are a sequence of fragmentary side elevational illustration views showing the movement of the sticker transfer conveyor to transfer stickers from a sticker distribution conveyor to the layer pickup station; in which FIG. 12 shows the sticker transfer conveyor with a sticker pushing element or arm in its rear position in preparation for removing an associated sticker from the sticker distribution conveyor; in which FIG. 13 shows the sticker pushing arm of the sticker transfer conveyor engaging a rear end of a sticker and pushing the sticker upward and forward to push the forward end of the sticker into a rotating sticker feed wheel; in which FIG. 14 shows the rotating sticker feed wheel feeding the sticker forward as the stacking arms move forward, while the sticker pushing element is being move upward out of the path of stickers on the sticker distribution conveyer; in which FIG. 15 shows the rotating sticker feed wheel continuing to feed the sticker forward while the sticker pushing element is being returned to its original position in a path out of the way of succeeding stickers on the sticker distribution conveyor; in which FIG. 16 shows the sticker loaded into the arm channel with the sticker pushing element returned to its original position in preparation for transferring another sticker from the sticker distribution conveyor;

FIG. 18 is fragmentary front view of a portion of the lumber stacking apparatus illustrating two stripper subassemblies that are moved upward and downward and partially rotated in the process of stripping a layer and its associated stickers from the arm assembly;

FIG. 19 is a fragmentary top view of one of the stripper subassemblies shown in FIG. 18 illustrating a lever that is actuated to swing a stripper finger into and out of position to strip a sticker from an stacking arm;

FIG. 20 is a fragmentary side view of one of the stripper subassemblies showing a lever for swinging the stripper finger;

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
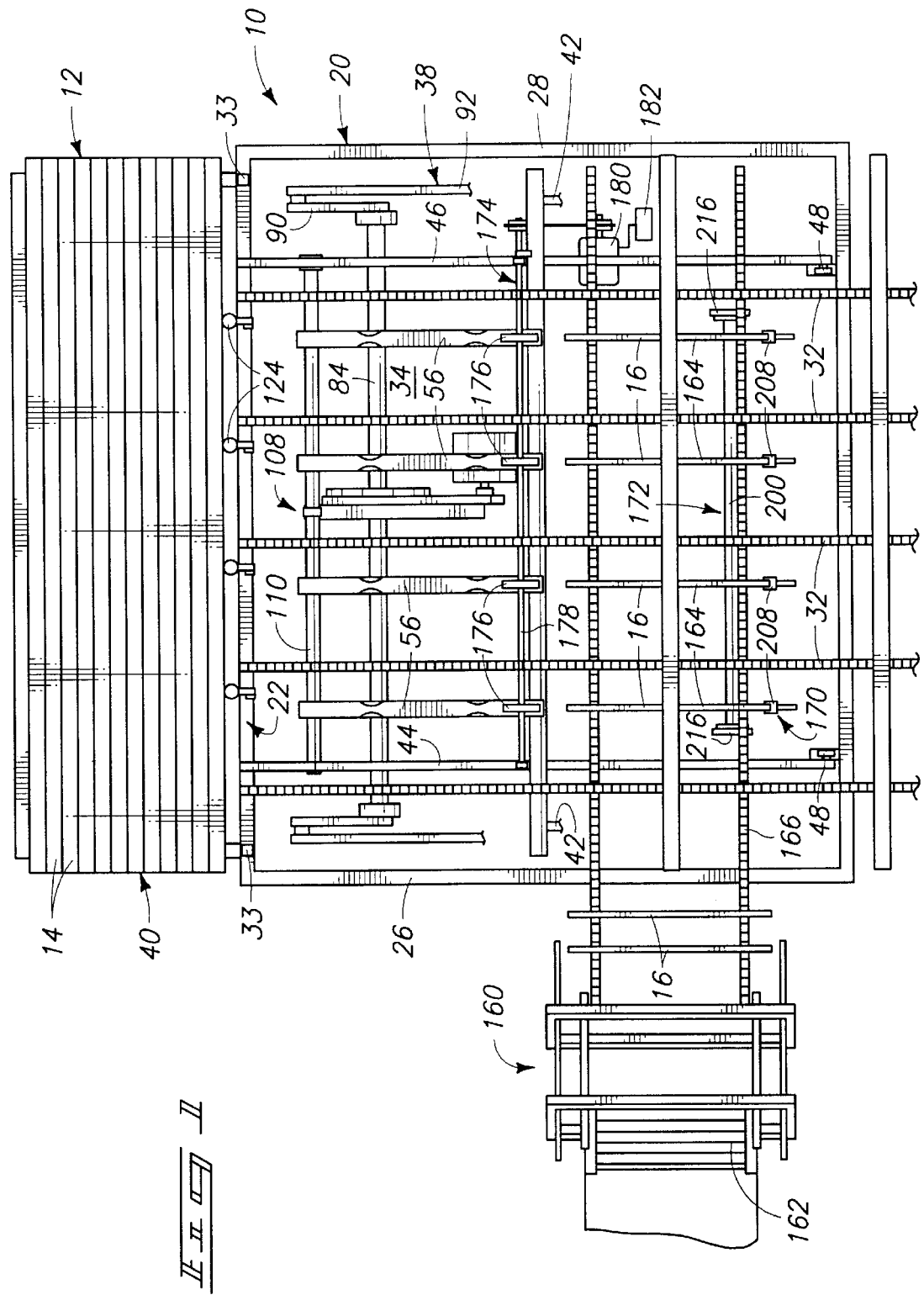
FIG. 1 is a plan view of a preferred embodiment of the lumber stacking apparatus of the present invention.

A preferred embodiment of the invention is shown in FIG. 1, with the lumber staking apparatus being generally designated with the numeral 10 for forming a stack 12 of a plurality of superimposed layers 14 of wooden boards. Stickers 16 are placed transverse between the layers at desired intervals to enable air to flow between the layers to evenly dry the wooden boards or lumber to reduce later warping, shrinkage and cracking. The stickers 16 may be placed between each layer or between selected layers.

The lumber stacking apparatus 10 includes a general frame 20 having a front side 22, a rear side 24, a left side 26 and a right side 28 as shown in FIG. 1. The general frame 20 includes a conventional board conveyor (details not shown) for sequentially feeding boards onto an elevated layer support surface 32 toward the front side 22 of the stacking apparatus 10. The elevated layer support surface 32 has stops or abutments 33 to stop the forward movement of the boards from the board conveyor and to accumulate the boards into a layer 14 prior to stacking. The forward part of the elevated layer support surface 32 defines a layer pickup station 34.

The lumber stacking apparatus 10 includes a layer handling assembly generally designated with the numeral 38 for sequentially removing the formed layers from the elevated layer support surface 32 and placing the layers 14 on top of each other at a layer stacking station 40 forward of the front side 22 of the frame 20 to form a stack with stickers 16 between the layers.

The layer handling assembly 38 includes a layer handing carriage 42 (FIGS. 2–7) that is moveably mounted on spaced parallel rails 44 and 46. Each of the rails 44, 46 is pivotally mounted to the frame adjacent the rear side 24 of the frame 20 by pivot bearings 48. The forward ends of the rails are moveable upward and downward about the rear pivot bearings 48.

The layer handling carriage 42 includes an arm structure 50 with individual spaced lifting arms 56 that extend forward from a cross beam 52. The carriage 42 is movably supported on the rails 44, 46 by wheels or rollers 54 to enable the lifting arms 56 to move between the layer pickup station 34 and the layer stacking station 40.

Each of the lifting arms 56 are preferably tapered as illustrated in FIG. 9 and extend from an arm base 58 connected to the cross beam 52 through a central section 60 to a tip 62. Each of the arms 56 are U-shaped in cross section as shown in FIGS. 9–11 having tapered side walls 62 defining a sticker channel 64 for receiving stickers 16 therein and carrying the stickers 16 from the layer pickup station 34 to the layer stacking station 40 beneath each layer of boards. The taper of the arms is sufficient to expose the forward ends of the stickers near the tips 62.

Within each sticker channel 64, the arm 56 has a rear sticker guide 66 and a spaced forward sticker guide 70. The rear sticker guide 66 includes opposing inclined side surfaces 66 and 68 that extend inward and downward in a curved convex manner to narrow the space between the side walls 62 to gently guide the rear end of the sticker 16 inward and downward into the center of the sticker channel 64. Likewise the forward guide 70 includes two opposing inclined side surfaces 72 and 74 that extend inward and downward in a curved convex manner to narrow the space between the side walls 63 to gently guide the forward end of the sticker 16 inward and downward to the center of the sticker channel 64 to accurately align the sticker 16.

Figure 3:
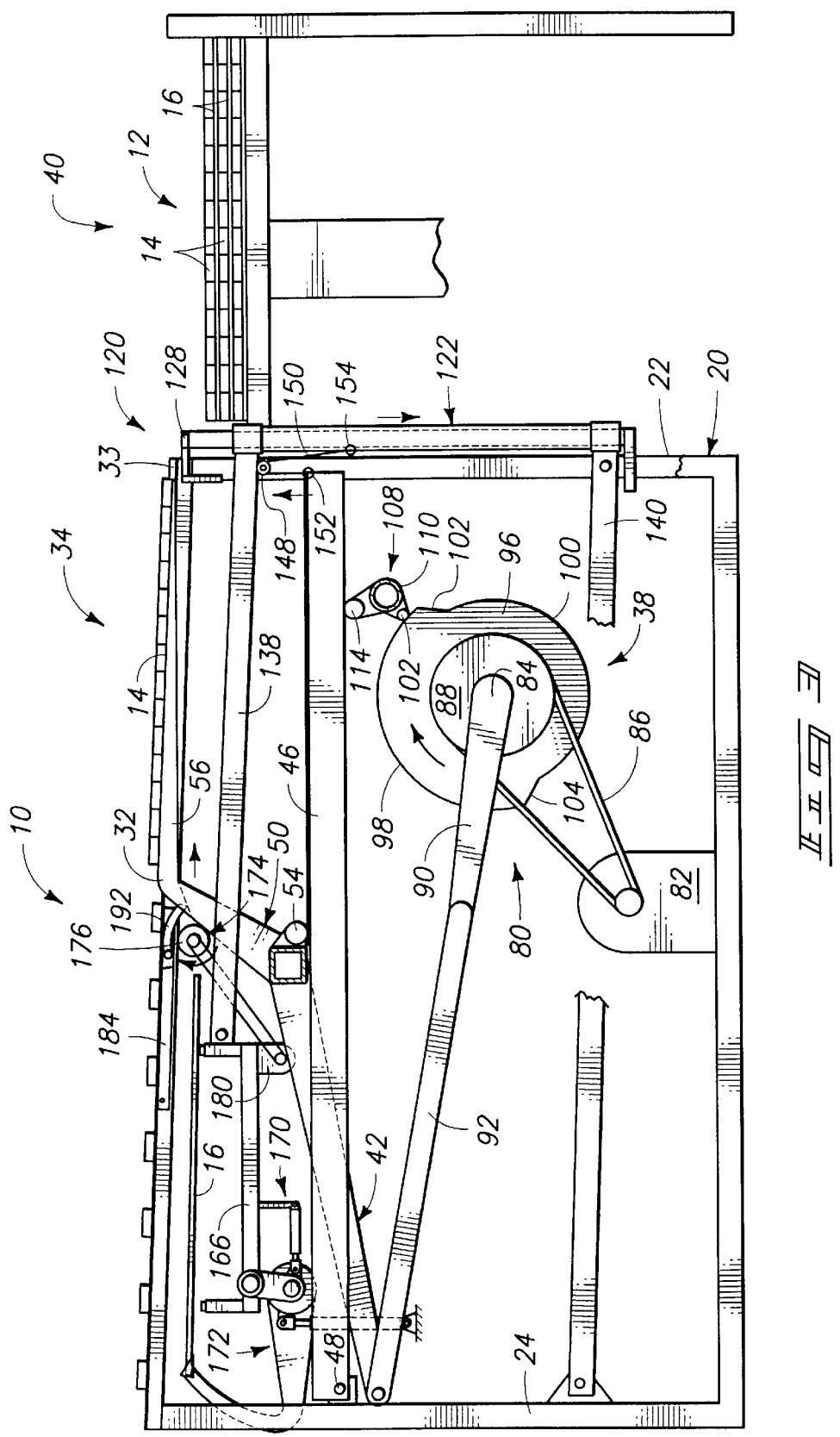
FIG. 3 is a fragmentary right side elevational view similar to FIG. 2 except showing the arm structure moved upward and partially forward to lift the layer from the elevated support surface.
Figure 4:
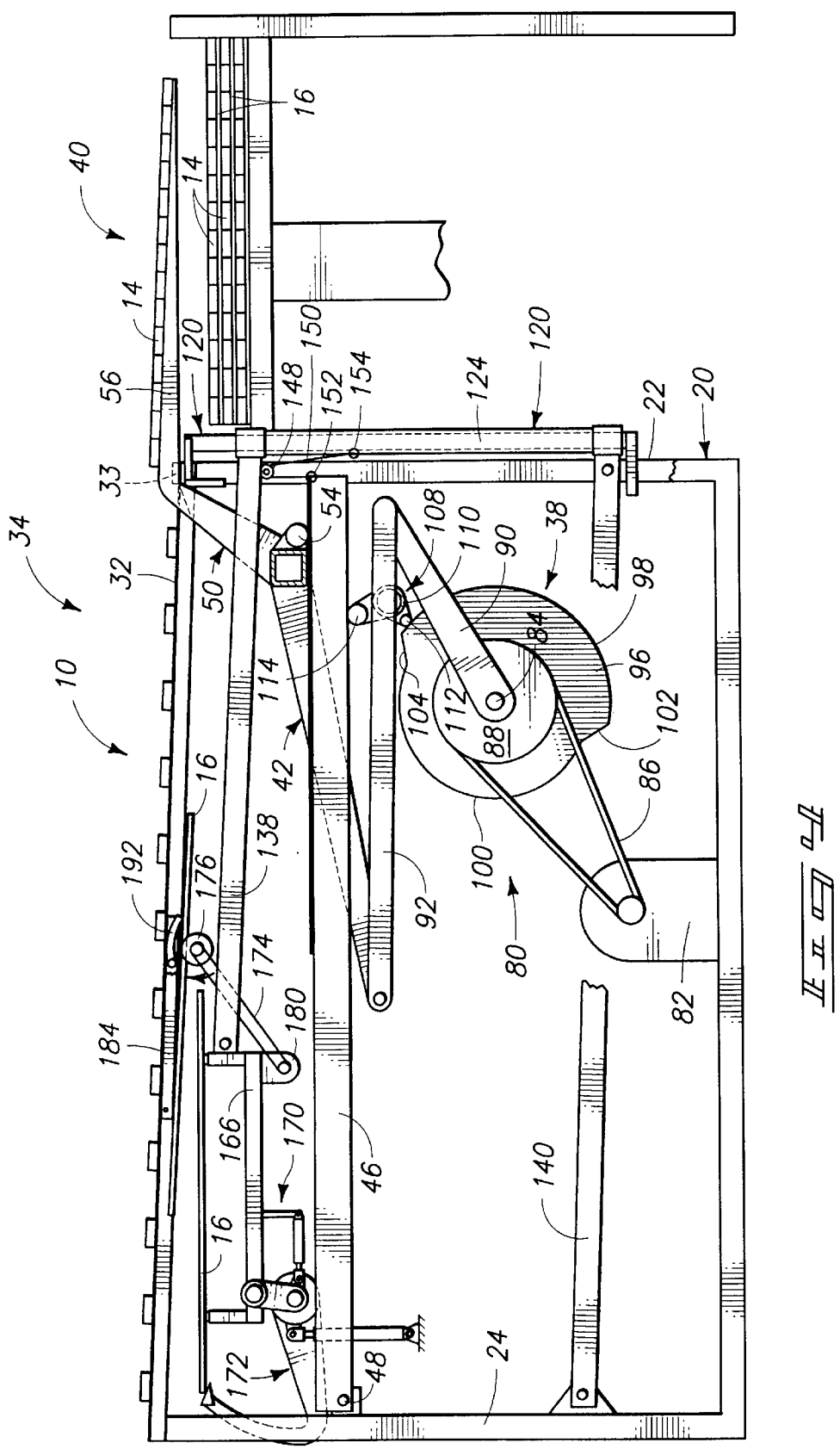
FIG. 4 is a fragmentary right side elevational view similar to FIG. 3 except showing the arm structure moved from the layer pickup station to a layer stacking station.
Figure 5:
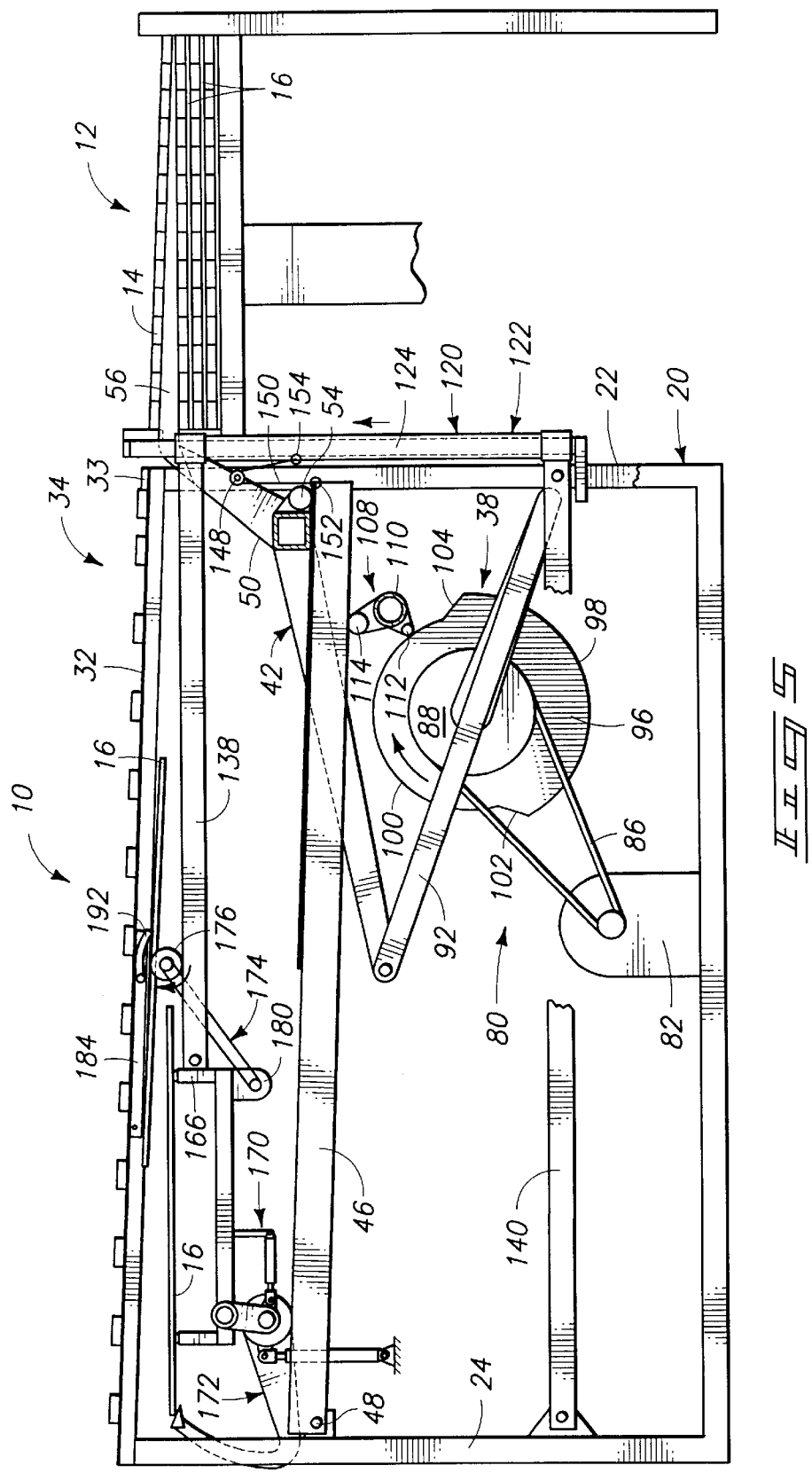
FIG. 5 is a fragmentary right side elevational view similar to FIG. 4 except showing the arm structure moving downward to lower the layer onto to the stack.
Figure 6:
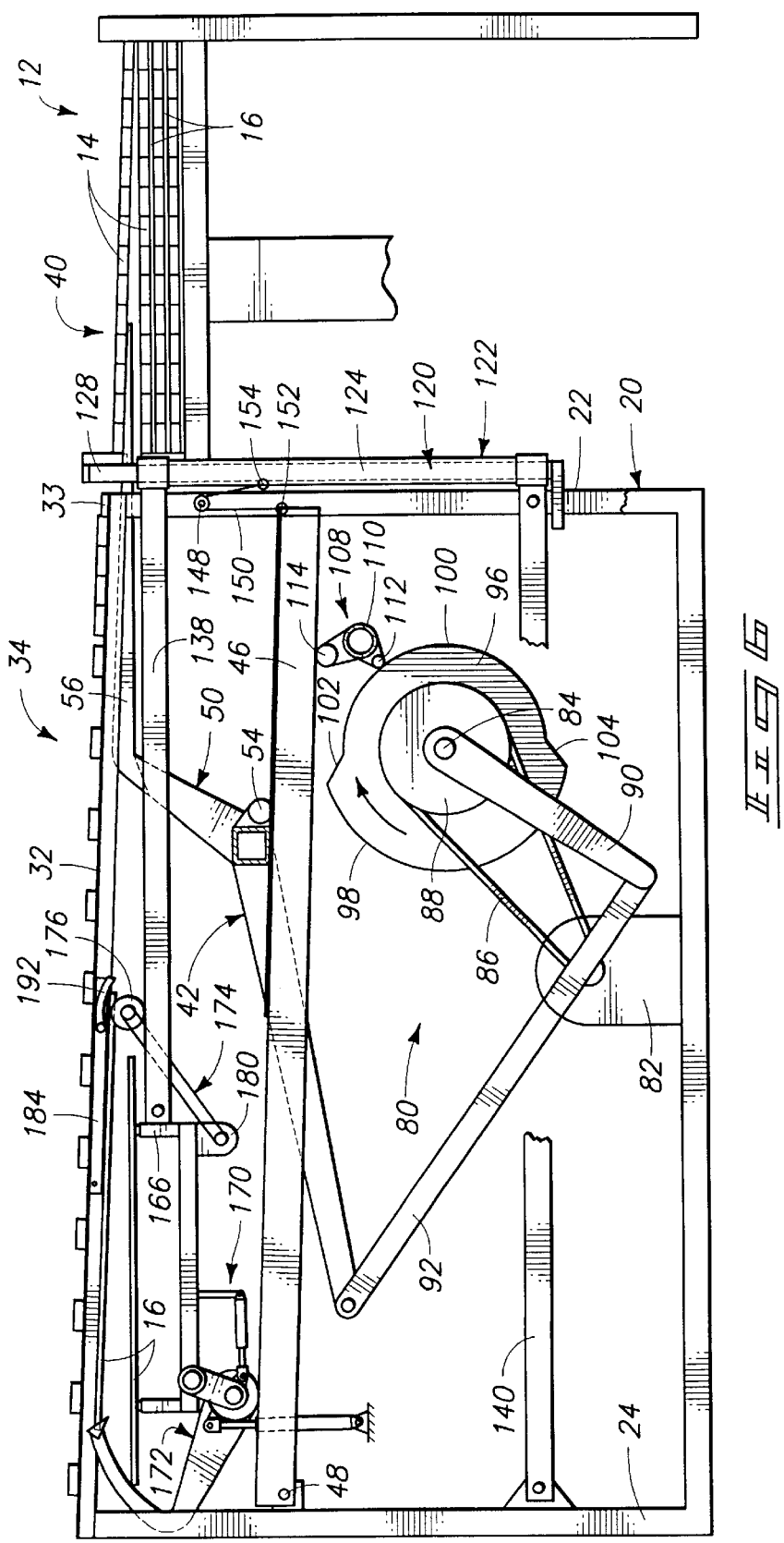
FIG. 6 is a fragmentary right side elevational view similar to FIG. 5 except showing the arm structure moving rearward stripping the layer and stickers from the arm structure onto preceding layers to form a stack.

The lumber stacking apparatus 20 has a drive assembly generally designated with the numeral 80 for moving the arm structure 50 (1) upward to pickup a layer from the elevated layer support surface 32 at the layer pickup station 34 (FIG. 3); (2) carrying the layer forward from the layer pickup station 34 to the layer stacking station 40 (FIG. 4); (3) lowering the layer at the layer stacking station onto the preceding layer (FIG. 5); and (4) rearward from the layer stacking station 40 to the layer pickup station 34 while stripping the layer and underlying stickers 16 from the arm structure in preparation for receiving a succeeding layer (FIGS. 6 and 7).

The drive assembly 80 includes a motor 82 that rotates a crank shaft 84 through a chain 86 and sprocket 88. A crank arm 90 is connected to the crank shaft 84. A connecting rod or lever 92 is pivotally connected between the connecting lever 92 and the layer handling carriage 42 for moving the arm structure 50 forward and rearward.

The drive assembly 80 includes a rather large cam 96 that is rotated by the crank shaft 84. The cam 96 has a cam lobe section 98, a cam dwell section 100 and cam transition sections 102 and 104.

The layer handling assembly 58 includes a cam follower assembly 108 that is responsive to the cam sections 98, 100, 102 and 104 for raising and lowering the front ends of the rails 44 and 46 to in turn raise and lower the layer handling carriage 42. The cam follower assembly 108 includes a cross-frame 110 that extends between and underneath the rails 44 and 46. A cam follower 112 is mounted on the cross-frame 110 and engages and responds to the cam 96 and its sections. Lifting rollers 114 are mounted on the cross-frame beneath and engaging the rails 44 and 46 for raising and lowering the rails 44, 46 in response to the cam follower 112.

The lumber stacking apparatus 10 further includes a layer/sticker stripping mechanism generally designated with the numeral 120 (FIGS. 2–7). The mechanism 120 includes a vertically moveable stripping frame 122 at the front side 22 that moves up and down in opposition to the up and down movement of the front ends of the rails 44 and 46. In essence the vertical movement of the stripping frame 122 is responsive to the drive assembly 80 and the cam 96.

The frame 122 includes vertical tubes 124, corresponding in number to the arms 56, that are position adjacent to the path of the arms 56 (FIGS. 18–22). Cross-frame members 126 interconnect the tubes 124 both at the bottom and tops of the tubes 124. Rods or smaller diameter tubes 128 are rotatably mounted within the tubes 124. The rods 128 are rotatably supported in the tubes 124 by top bearings 130.

A portion of the rods 128 extends above the bearings 130 and the tubes 124. Stripper arms 134 are mounted to the extended rod sections and extend radially outward therefrom as shown in FIGS. 18–22. Sticker stripping fingers 136 are mounted to the stripper arms 134 and extend downward substantially parallel with the rods 128. The purpose of the fingers 136 is to project into the sticker channels 64 of the arms 56 when the arms 56 are at the layer stacking station 40 to strip the stickers 16 from the channels 64 as the arms 56 are retracted.

The vertically movable stripping frame 122 is supported at the front side 22 by upper pivot beams 138 and lower pivot beams 140 that are pivotally connected to the frame 20 at the rear ends of the beams 138 and 140 to enable the frame 122 to move up and down along the front side 22 (FIGS. 2–7).

The layer stripping mechanism 120 includes pulleys 148 mounted on the frame 20 adjacent the front side 22 as illustrated in FIGS. 2–7. Lifting/lowering cables 150 extends over the pulleys 148 with one end connected to cable attachments 152 on rails 44 and 46. The opposite ends of the cables 150 are connected to cable attachments 154 on the stripping frame.

Figure 2:
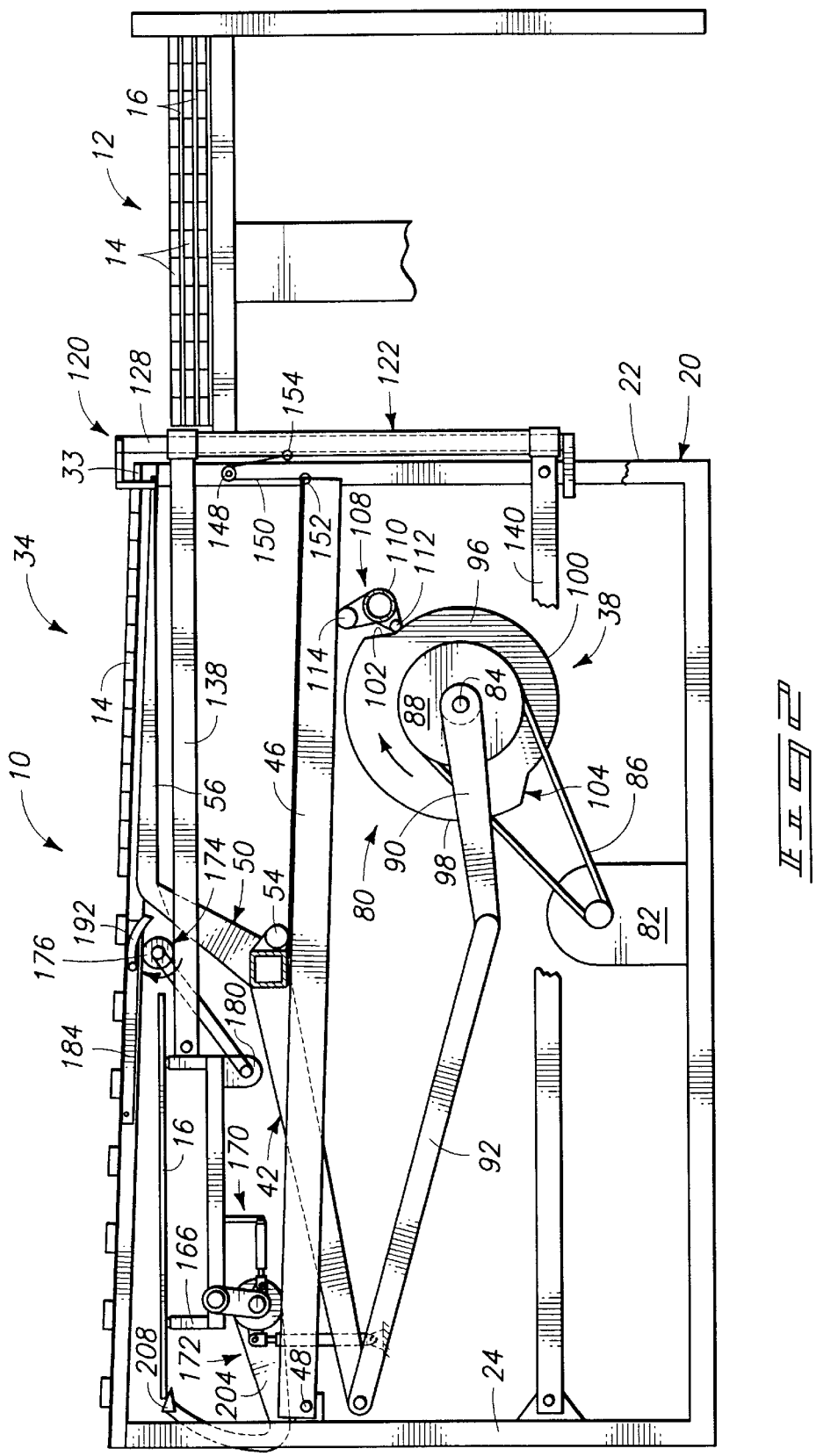
FIG. 2 is a fragmentary right side elevational view showing a layer of boards on an elevated support surface and an arm support structure at a layer pickup station below the elevated support surface for supporting a layer of lumber boards.

The vertical movement of the stripping frame 122 is thus responsive to the vertical movement of the front ends of the rails 44 and 46 but in the opposite direction. Thus when the front ends of the rails 44 and 46 are raised by the cam lobe section 98 to lift the arm structure 50, the movable stripping frame 122 moves downward out of the path of the layer carried by the arms 56 as illustrated in FIGS. 2–4. When the front ends of the rails 44 and 46 are lowered by the cam dwell section 100 to lower the arm structure 50, the movable stripping frame 122 moves upward into the path of the lowered layer to strip the layer from the arms 56 when the arm structure 50 is moved rearward as illustrated in FIGS. 5–7.

Once the stripping frame 122 is raised, the rods 128, the striping arms and stripping fingers 136 are rotated by interconnected radial pivot levers 142 that are connected to lower ends of the rods 132 as shown in FIGS. 19 and 20. A connecting rod 144 interconnects the pivot levers 142 so that the levers 142 are moved in unison. A pivot drive cylinder 146 is connected to a pivot lever 142 to move the levers 142 to rotate the rods 128.

Preferably the lumber stacking apparatus 10 has a sticker distribution conveyor generally designated with the numeral 160 for distributing stickers 16 from a sticker magazine 162 to a plurality of sticker stations 164 associated with the arms 56. The sticker distribution conveyor 160 includes a conveyor frame 166 that extends transversely across the general frame 20 adjacent the rear side 24. Should the reader desire more information concerning the sticker distribution conveyor 160, the reader's attention is directed to the Lunden U.S. Pat. No. 3,904,044 issued Sep. 9, 1975, which is incorporated by reference into this document.

The lumber stacking apparatus 10 further includes sticker transfer conveyor 170 mounted to the general frame 20 at the sticker stations 164 for transferring the stickers 16 from the sticker distribution conveyor 160 to the corresponding arms 56 in coordination with the stacking process.

The sticker transfer conveyor 170 includes a sticker removal subassembly 172 for removing the stickers 16 from the sticker distribution conveyor 160 at the sticker stations and a sticker feeding subassembly 174 for feeding the removed stickers 16 lengthwise into the sticker channels 64 in the arms 56.

The sticker feeding subassembly 174 has a series of sticker feed wheels 176 aligned with associated sticker stations that are mounted on a transverse drive shaft 178. The drive shaft 178 is rotated by a motor 180, the speed of which may be varied by a speed control circuit 182. The speed of the motor is set to rotate the wheels 176 at a peripheral speed that is less than and preferably between one-half and three-quarters of the average forward and rearward speed of the arms 56. Preferably the peripheral surface of each wheel 176 has a high coefficient of friction to grip the underside of the sticker 16 and feed the gripped stickers forward without the sticker 16 slipping relative to the wheel 176.

The sticker feeding subassembly 174 includes an overhead guide 184 associated with and immediately above each wheel 176 to guide and align the sticker 16 as the sticker 16 is being feed by the wheel 176. Preferably the guide 184 includes an inverted U-shaped channel 186 supporting a series of guide rollers 188. The guides 184 are pivotally mounted to the general frame 20 adjacent a rear end of the channel 186 to enable its forward end to be biased downward by gravity to a limited degree to direct a sticker into and over the associated wheel 176.

The sticker feeding subassembly 174 additionally includes gravity biased end deflectors 192 extending over and forward of the wheels 176 for directing the rear ends of the stickers downward into the sticker channels 64 as illustrated in FIG. 7 to minimize vibration of the rear ends of the stickers as they are placed to the channels 64.

The sticker removal subassembly 172 includes an elongated pivot shaft or tube 200 rotatably supported by suspended bearings 202 below the distribution conveyor 160 and extending between the sticker stations 164 for rotational movement about a shaft axis defined by the bearings 202. Generally "C" shaped arms 204 are mounted on the shaft 200 at respective sticker stations. Each arm 204 extends from a base, attached to the shaft 200, to a free outer end. The outer end has a pocket or cup 208 formed thereon for engaging the rear end of a sticker resting at the associated sticker station 164 as illustrated in FIGS. 3 and 13. A drive cylinder 212 is connected to the shaft 200 through a lever to partially rotate the shaft and swing the arms 204 when the cylinder 212 is actuated.

As shown in FIGS. 12–16, the shaft 200 and the bearings 202 are supported from the frame 20 by pivot links 216 for enabling the shaft 200 and the arms 204 to additionally pivot about a pivot axis 218. A drive cylinder 220 is connected to the links 216 for selectively pivoting the shaft 200 and the arms 204 about the pivot axis 216. An actuation control circuit 230 is operatively connected to the cylinders 212 and 220 to time the occurrence and the duration of each actuation during each layer stacking cycle. Preferably the actuation control circuit 230 is set to actuate the cylinder 212 very early in the stacking cycle to remove the stickers 16 from the sticker stations 164 and begin the forward movement of the stickers 16 toward the lifting arms 56.

Figure 17:
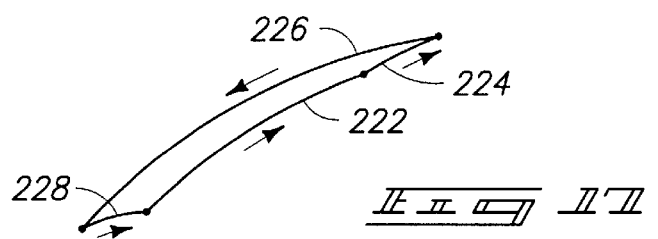
FIG. 17 is a schematic view of the various paths of the sticker pushing element during a cycle of transferring a sticker from the sticker distribution conveyor to the stacking arms.

The initial upward and forward stokes or paths of the pockets 208 are represented by the curved line 222 shown in the schematic of FIG. 17. At the end of the initial strokes, the drive cylinder 220 is actuated to pivot the shaft 200 about pivot axis 218 upward to move the curved arms 204 and the pockets 208 out of the paths of the succeeding stickers 16 on the distribution conveyor 160 as illustrated in FIG. 14. The upward stroke is represented by the line 224 in FIG. 17. This enables the distribution conveyor 160 to be activated early in the stacking cycle to move succeeding stickers to the sticker stations 164 at slower speeds that are less likely to cause a sticker jam while not impeding the fast stacking cycle.

Figure 15:
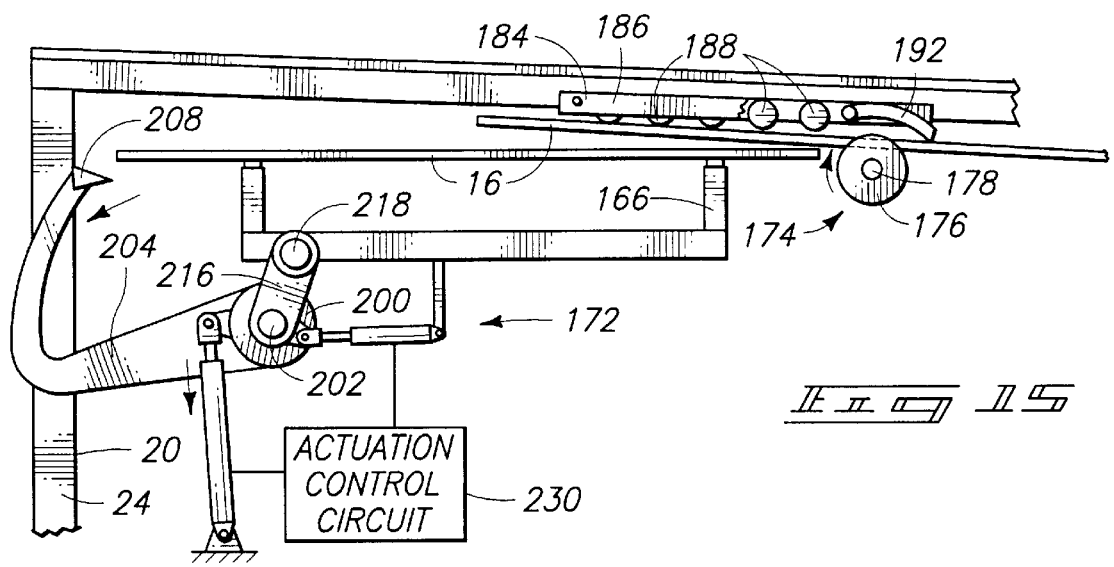

The drive cylinder 212 is then actuated to rotate the curved arms 204 and the pockets 208 rearward and downward in the "out-of-theway" paths 226 (FIG. 17) as illustrated in FIG. 15. Then the drive cylinder 220 is activated to move the curved arms 204 and the pockets 208 in paths 228 (FIG. 17) to their initial positions in preparation to feed a set of succeeding stickers during the next cycle. It should be noted that the curved arms 204 are moved out of the way of the paths of the succeeding stickers on the distribution conveyor 160 as soon as the preceding stickers are removed from the distribution conveyor 160. This feature is particularly useful in enabling the operator to adjust and vary the speed of the distribution conveyor 160 depending upon the length of the stickers, the spacing of the sticker stations 164, the width of the stack, and the length and thickness of the boards being stacked to minimize "sticker jam", without reducing the stacking efficiency.

As previously mentioned, the lengthwise forward movement of the stickers 16 from the sticker stations 164 toward the layer pickup station 34 is initiated as the arm structure 50 moves forward and well in advance of the rearward movement of the arm structure 50. However the forward lengthwise movement of the stickers 16 is considerably less than the average speed of the forward and back movement of the arm structure 50. Preferably the peripheral speed of the wheels and the forward movement of the stickers is between one-half and three-quarters of the average speed of the arm structure.

The operation of the apparatus 10 is briefly described as follows. At the beginning of each stacking cycle, the cam 96 lifts the front ends of the rails 44 and 46 to (1) raise the arm structure 50 to lift a formed layer above the elevated layer support surface 32 and the stops 33, and (2) lower the layer stripping mechanism 120 out of the path of the elevated layer as illustrated in FIG. 3. The crank arm 88 then moves the arm structure 50 and the elevated layer forward from the layer pickup station 34 over the lowered layer stripping mechanism 120 to the layer stacking station 40, as illustrated in FIGS. 3 and 4. As soon as the arm structure 50 moves forward, the sticker transfer conveyor 170 is activated by the cylinder control circuit 230 to remove the stickers 16 from the sticker distribution conveyor 160 and begin moving the stickers lengthwise toward the layer pickup station 34 as illustrated in FIGS. 3 and 13.

Figure 21:
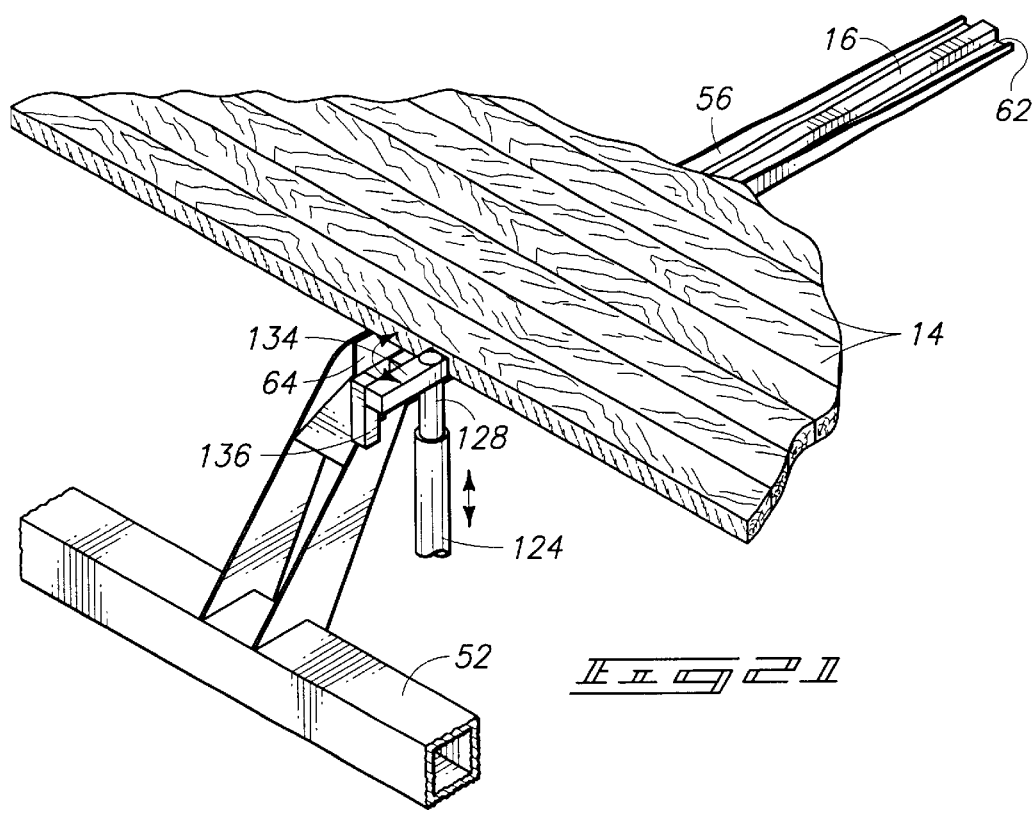
FIG. 21 is a fragmentary isometric view of a portion of the arm structure supporting a layer at the layer stacking station and showing an associated stripper subassembly moving a stripper finger into position to strip the layer from the arm.
Figure 22:
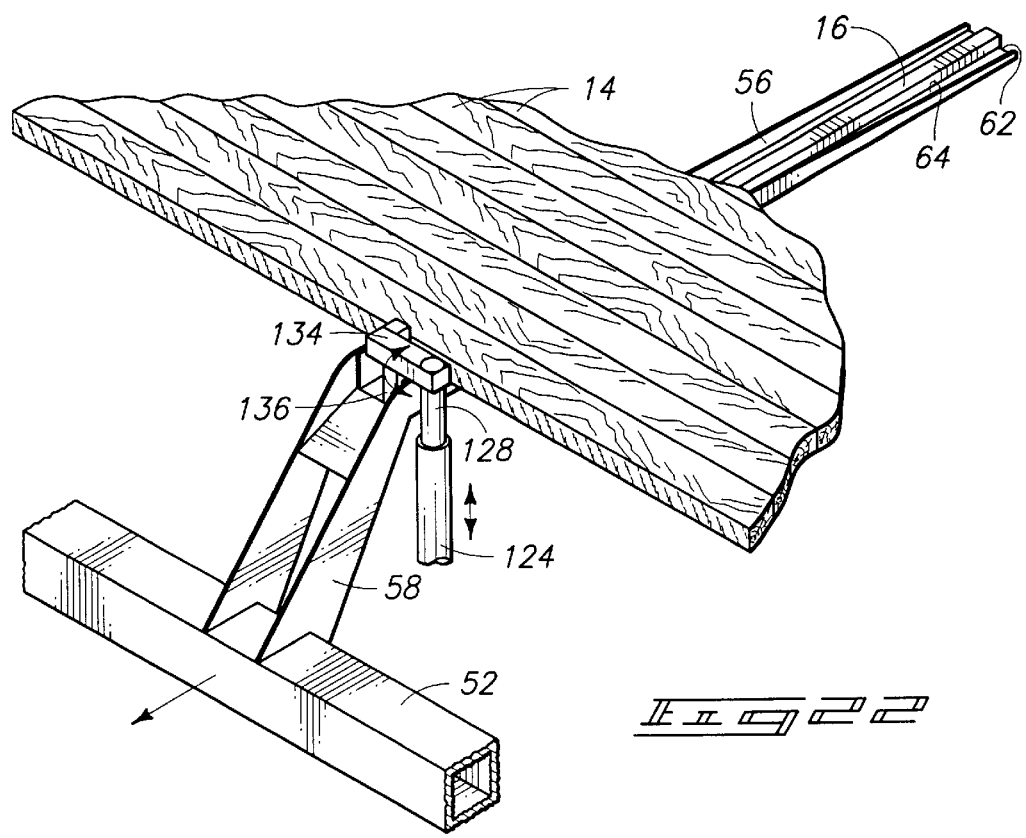
FIG. 22 is a fragmentary vertical view similar to FIG. 21 except showing the sticker finger in position to strip the layer and associated sticker from the stacking arm as the stacking arm is retracted.

When the lifting arms 56 and the carried layer reaches the layer stacking station 40 in front of the layer stripping mechanism 120, the cam 96 lowers the forward ends of the rails 44 and 46 to (1) lower the lifting arms 56 to the top of the stack, and (2) raise the layer stripping mechanism 120 to the position shown in FIG. 5. At this point, the pivot cylinder 146 is actuated to partially rotate the rods 128 and swing the stripping fingers 136 into rear ends of the sticker channels 64 as illustrated in FIGS. 19 and 21. The crank arm 90 then moves the carriage 42 rearward pulling the arms 56 out from underneath the layer 14, stripping the layer 14 and the stickers 16 against the raised layer stripping mechanism 120 and depositing the layer 14 on top of the stack 12. Continued rearward movement of the carriage 42 returns the arms 56 to the layer pickup station 34 in preparation to receive a succeeding layer. Prior to initiating a now cycle the drive cylinder 146 is actuated to rotate the rods 128 and return the sticker stripping fingers to their original position out of the paths of the arms 56.

Turning more specifically to the operation of the sticker transfer conveyor 170 and the lengthwise feeding of the stickers from the sticker stations 164 and the layer pickup station 34, the readers attention is directed to FIGS. 12–16. Specifically, the drive cylinder 212 is actuated, as the arm structure 50 is initially moved forward, to rotate the shaft 200 and connecting "C" shaped curved arms 204 to move the pockets 208 upward and forward to engage the rear ends of the stickers 16 and propel the front ends of the stickers 16 between the rotating wheels 176 and the overhead guides 184. The initial forward and upward motion or stroke of the pockets 208 is illustrated by the path 222 shown in FIG. 17.

After the front ends of the stickers 16 are firmly gripped between the overhead guides 184 and the rotating wheels 176, the rotating wheels 176 continue feeding the stickers forward. The drive cylinder 220 is actuated to swing the shaft 200 and curved arms 204 about the pivot axis 218 to move the curved arms 204 upwards projecting the pockets 208 in the path 224 illustrated in FIG. 17. Such a movement places the curved arms 204 out-of-the path of the succeeding stickers 16 on the sticker distribution conveyor 160 as illustrated in FIG. 14. The timing and operation of the drive cylinders 212 and 220 is controlled by the actuation control circuit 230. This allows the sticker distribution conveyor 160 to begin moving stickers 16 to the sticker stations 164 very early in the stacking cycle at slower more gentle speeds to minimize misalignment of the stickers at the sticker stations 165 without slowing the stacking efficiency.

Figure 16:
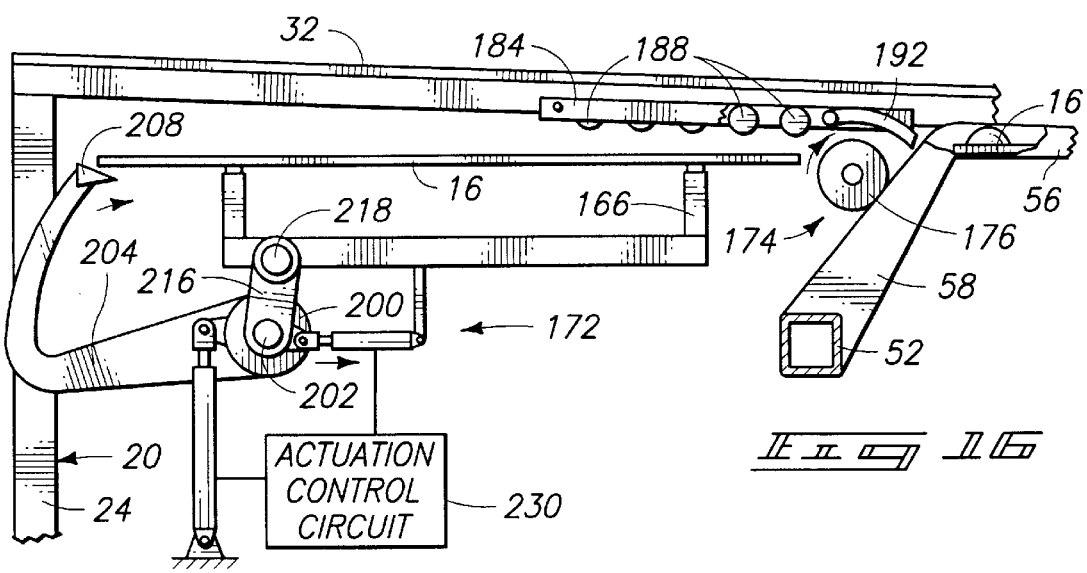

The curved arms 204 are returned to their original start positions by sequential actuation of drive cylinders 212 and 220 as illustrated in FIGS. 15 and 16. The pockets 208 move in paths 226 and 228 as illustrated in FIG. 17. The "out-of-the-way" return strokes of the curve arms 204 occur while succeeding stickers 16 are being fed to the sticker stations 164 in preparation for the next stacking cycle.

As previously mentioned, the sticker transfer conveyor 170 is activated to start feeding the stickers lengthwise from the sticker stations 164 to the layer pickup station 34 very early in the stacking cycle. The stickers 16 are fed forward by the wheels 176 at a speed that is considerably less than the average speed of the back and forth movement of the carriage 42. Preferably the speed control circuit 182 is adjusted to control the motor 180 speed so that the peripheral speed of the wheels 176 is between one-half and three-quarters of the average reciprocal speed of the carriage 42. Consequently the stickers 16 are feed forward to the layer pickup station 34 earlier in the cycle at a slower more gentle speed to reduce the incidents of sticker jam without reducing the stacking cycle period.

FIGS. 3–5 show the stickers 16 being continuously feed forward, although at a slower speed than the arms 56, so that the stickers 16 will move between one-quarter to one-half of their travel by the time that lifting arms 56 have reached the layer stacking station 40. As the arms 56 move rearward the forward ends of the stickers progressively project into the arm channels 64 (see FIGS. 6 and 7). The channel guides 66 and 70 assist in aligning the forward moving stickers 16 in the rearward moving channels 64. The rear end of the stickers 16 are deposited in the channels 64 when the arms 56 are fully retracted.

Preferably, the timing or start of the initial removal of the stickers 16 from the sticker stations 164 by the actuation control circuit 230 and the forward speed of the stickers by the speed control circuit 182 are selected so that the rear ends of the stickers leave the wheels 176, with the end deflectors 192 directing the rear ends downward into the rear ends of the channels 64, at the very end of the cycle. Thus the arms 56 are substantially horizontally stationary when the sticker rear ends enter the channels 64 so that the stickers 16 are placed in the channels 64 as gently as possible. Such a feature materially reduces the incidents of "sticker jam" while still forming the stacks at very fast cycle or lay-up rates.

For example, it is quite desirable to stack layers of boards with stickers between the layers at cycle speeds of ten or more layers per minute with a cycle period being six seconds or less. To accomplish such a rapid cycle time, the drive shaft 84 must be rotated to cause the arms 56 to pickup a layer and move forward from the layer pickup station 34 to the layer stacking station in three seconds or less and then to lower the layer onto the stack and strip the layer from the arms 56 and move rearward to the starting position within the remaining three seconds or less. This requires that the sticker transfer conveyor 170 be operated to feed the stickers lengthwise from the sticker stations 164 to the layer pickup station 40 within six seconds. This is quite difficult to do without increasing the incidents of "sticker jam" resulting in considerable down time.

Most prior art machines are designed using very uniform and "perfect" stickers that are straight and uniform. However even if the stickers are straight and uniform when first used, they seldom remain straight and uniform after substantial use. It is not unusual when using many of the prior art machines that the operator must stop the stacking process and manually sort out a sticker jam before starting the process again. If there are frequent sticker jams caused by imperfect stickers, the operator usually is forced to slow down the stacking process or cycle time to lower the incidents of sticker placement malfunction thereby reducing productivity. The present invention is design to minimize sticker jam problems and handle less than "perfect" stickers all with the goal of maintaining a high level of productivity.

Furthermore, the speed control circuit 182 and the cylinder control circuit 230 permits the operator to adjust the operation of the sticker distribution conveyor 160 and the sticker transfer conveyor 170 to enable the apparatus 10 to accommodate different sticker lengths, different spacings between sticker stations, different stack widths, and different lengths and thicknesses of boards without compromising the stacking efficiency.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A lumber stacking apparatus for forming a stack of boards having a plurality of superimposed layers of elongated boards, in which selected layers are separated by stickers that are oriented transversely to the elongated boards at desired sticker intervals along the length of the boards, said apparatus comprising:

a frame extending from a rear portion having a plurality of transversely spaced sticker stations remote from the stack to a layer pickup station adjacent a front section facing the stack;

an elevated layer support surface supported on the frame at the layer pickup station for successively supporting layers of elongated boards thereon;

an arm structure movably mounted on the frame for sequentially (1) moving upward at the layer pickup station to remove a layer of boards from the layer support surface; (2) moving the removed layer forward from the pickup station to a layer stacking station; (3) moving downward to deposit the removed layer at the layer stacking station superimposed on a preceding layer to form the stack; and (4) moving rearward from the layer stacking station to the layer pickup station in preparation for picking up a succeeding layer;

arm structure drive means operatively connected to the arm structure for moving the arm structure forward and rearward at a predetermined average speed;

an elongated sticker distribution conveyor extending transversely along the rear portion of the frame between the spaced sticker stations corresponding to the desired sticker intervals for receiving a plurality of stickers and distributing the stickers individually to the spaced sticker stations;

a sticker transfer conveyor extending between the sticker stations and the layer pickup station for removing the stickers from the sticker stations and moving the stickers lengthwise to the layer pickup station and depositing the stickers at the layer pickup station; and control means operatively connected to the sticker transfer conveyor for activating the sticker transfer conveyor to remove the stickers from the sticker station and to move the stickers lengthwise toward the layer pickup station at a selected speed substantially less than the predetermined average speed of the arm structure while the arm structure is moving the removed layer from the layer pickup station to the layer stacking station.

2. The lumber stacking apparatus as defined in claim 1 wherein the sticker transfer conveyor includes a sticker feeding subassembly adjacent the layer pickup station for initially receiving the front ends of the stickers and feeding the stickers to the layer pickup station and depositing the stickers at the layer pickup station and wherein the control means is operatively connected to the sticker feeding subassembly to feed the stickers to the layer pickup station at the selected speed substantially less than the predetermined average speed of the arm structure.

3. The lumber stacking apparatus as defined in claim 2 wherein the selected sticker speed is between one-half and three-quarters of the predetermined arm structure average speed.

4. The lumber stacking apparatus as defined in claim 2 wherein the sticker transfer conveyor includes a sticker removal subassembly for engaging the rear ends of the stickers at the sticker stations and propelling the stickers lengthwise to the sticker feeding subassembly while the arm structure is moving forward.

5. The lumber stacking apparatus as defined in claim 4 wherein the sticker removal subassembly includes pushing elements that engage the rear ends of the stickers and push the stickers upward and forward in a forward pushing stroke in a preset forward path and rearward in a return stroke in a preset rearward path and wherein the preset rearward path is spaced from the preset forward path sufficiently so that the pushing elements are out-of-the-way of succeeding stickers to enable the sticker distribution conveyor to distribute the succeeding stickers to the sticker stations while the pushing elements are being moved rearward.

6. The lumber stacking apparatus as defined in claim 4 wherein the sticker removal subassembly has a drive means and wherein the control means is operatively connected thereto for activating the drive means to remove the stickers from the sticker stations during initial forward movement of the arm structure.

7. The lumber stacking apparatus as defined in claim 5 wherein each of the pushing elements includes a movably mounted, generally "C" shaped arm with a pocket on one end thereof for engaging the rear end of a sticker at a sticker station and propelling the sticker lengthwise from the sticker station to the layer pickup station.

8. The lumber stacking apparatus as defined in claim 1 wherein the arm structure includes a plurality of lifting arms corresponding with the sticker stations and wherein each of the corresponding lifting arms has an open sticker channel formed therein for receiving the stickers when the stickers are moved lengthwise to the layer pickup station to carry the stickers in the open channels underneath the layer as the layer is being moved from the layer pickup station to the layer stacking station.

9. The lumber stacking apparatus as defined in claim 8 wherein each of the corresponding lifting arms has tapered side walls that extend from a base to tip in which the taper is sufficient to expose the front end of a sticker within the open channel.

10. The lumber stacking apparatus as defined in claim 8 further comprising a layer stripping mechanism adjacent the front of the frame that is responsive to the upward and downward movement of the arm structure for automatically lowering below the path of the layer carried by the arm structure from the layer pickup station to the layer stacking station and for automatically raising into the path of the layer as the arm structure is being retracted from the layer stacking station to the layer pickup station to strip the layer and underneath stickers from the arm structure.

11. The lumber stacking apparatus as defined in claim 10 wherein the layer stripping mechanism includes sticker stripping fingers that are movable into the open channels of the lifting arms behind rear ends of the stickers when the arm structure is at the layer stacking station to strip the stickers from the open channels as the arm structure is retracted.

12. The lumber stacking apparatus as defined in claim 8 wherein each of the corresponding lifting arms have sticker guides therein in which the guides have inclined side surfaces for guiding the sticker into the channel with the sticker being aligned.

13. The lumber stacking apparatus as defined in claim 8 wherein the sticker transfer conveyor includes a sticker feeding subassembly adjacent the layer pickup station for initially receiving the front ends of the stickers and feeding the stickers forward toward the open channels of the lifting arms at a selected speed while the arm structure is moving forward to the layer stacking station at a predetermined average arm structure speed and for depositing the stickers in the open channels of the lifting arms as the arm structure is returned to the layer pickup station, in which the selected sticker speed is less than the predetermined average speed of the arm structure to gently move the stickers into the arm channels.

14. The lumber stacking apparatus as defined in claim 13 wherein the selected sticker speed is between one-half and three-quarters of the predetermined average arm structure speed.

15. The lumber stacking apparatus as defined in claim 13 wherein the sticker feeding subassembly includes a drive wheel associated with each sticker station that is rotated with a peripheral speed corresponding to the selected sticker speed and further includes a sticker guide adjacent the wheel for directing the sticker against the wheel and to maintain alignment of the sticker as the sticker is being fed forward by the rotating drive wheel.

16. The lumber stacking apparatus as defined in claim 15 wherein the sticker feeding subassembly further includes a sticker end deflector adjacent the wheel for deflecting the rear end downward into the corresponding arm channel as the rear end leaves the wheel.

* * * * *

UNITED STATES PATENT AND TRADEMARK OFFICE
CERTIFICATE OF CORRECTION

PATENT NO. : 6,722,844 B2
DATED : April 20, 2004
INVENTOR(S) : Sidney L. Lunden

It is certified that error appears in the above-identified patent and that said Letters Patent is hereby corrected as shown below:

Column 1,
Line 32, replace "at the desired Intervals on top of each layer after the layer" with -- at the desired intervals on top of each layer after the layer --
Line 40, replace "in which the stickers are feed from a" with -- in which the stickers are fed from a --

Column 2,
Line 52, replace "forward, while the sticker pushing element is being move" with -- forward, while the stickers pushing element is being moved --

Column 3,
Line 31, replace "with the lumber staking apparatus being generally" with -- with the lumber stacking apparatus being generally --

Column 5,
Line 48, replace "striping arms and stripping fingers 136 are rotated by" with -- stripping arms and stripping fingers 136 are rotated by --

Column 6,
Line 26, replace "is being feed by the wheel 176. Preferably the guide 184" with -- is being fed by the wheel 176. Preferably the guide 184 --

Column 7,
Line 14, replace "in the "out-of-theway" paths 226 (FIG. 17) as" with -- in the "out-of-the-way" paths 226 (FIG. 17) as --

UNITED STATES PATENT AND TRADEMARK OFFICE
CERTIFICATE OF CORRECTION

PATENT NO. : 6,722,844 B2
DATED : April 20, 2004
INVENTOR(S) : Sidney L. Lunden

It is certified that error appears in the above-identified patent and that said Letters Patent is hereby corrected as shown below:

Column 8,
Line 4, replace "succeeding layer. Prior to initiating a now cycle the drive" with
-- succeeding layer. Prior to initiating a new cycle the drive --
Line 53, replace "Consequently the stickers 16 are feed forward to the layer" with
-- Consequently the stickers 16 are fed forward to the layer --
Line 57, replace "FIGS. 3-5 show the stickers 16 being continuously feed" with -- FIGS. 3-5 show the stickers 16 being continuously fed --

Signed and Sealed this

Twenty-seventh Day of July, 2004

JON W. DUDAS
*Acting Director of the United States Patent and Trademark Office*